May 19, 1931. C. DE MATTIA 1,805,514
EMERY WHEEL DRESSING TOOL
Filed Aug. 12, 1930 2 Sheets-Sheet 1
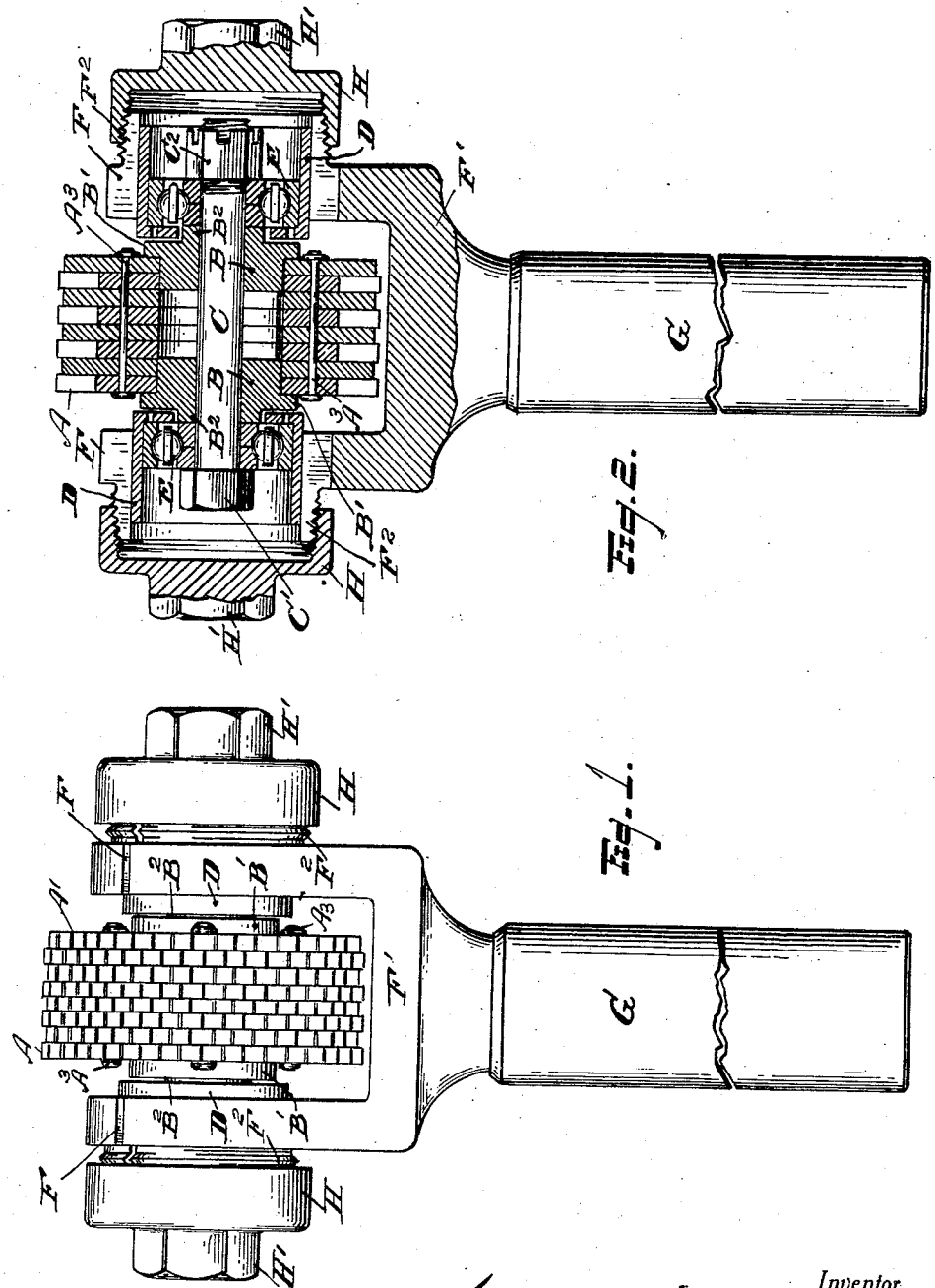
Inventor
Constant De Mattia
By S. E. Thomas
Attorney May 19, 1931. C. DE MATTIA 1,805,514
EMERY WHEEL DRESSING TOOL
Filed Aug. 12, 1930 2 Sheets-Sheet 2
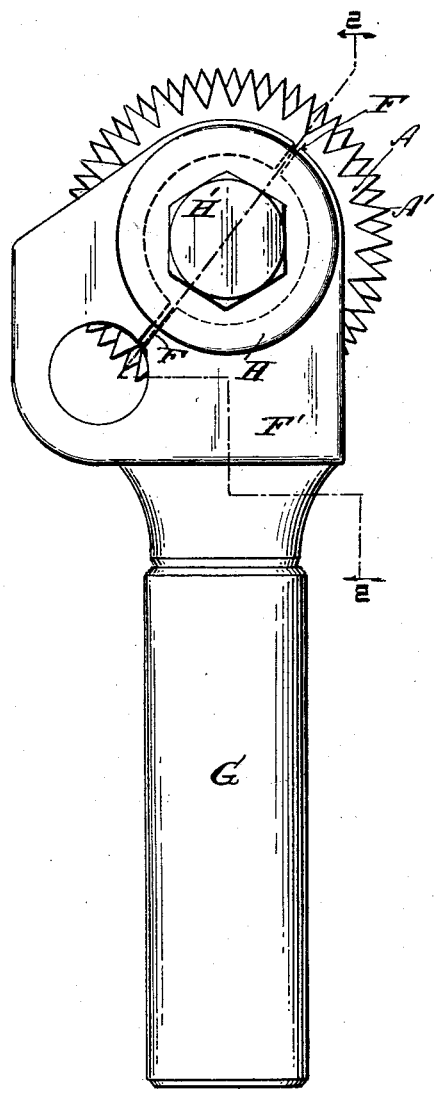
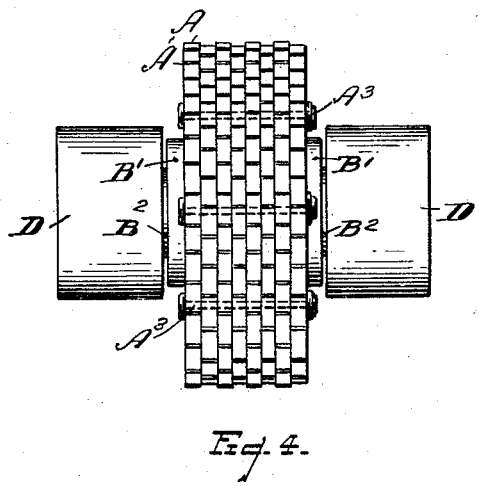
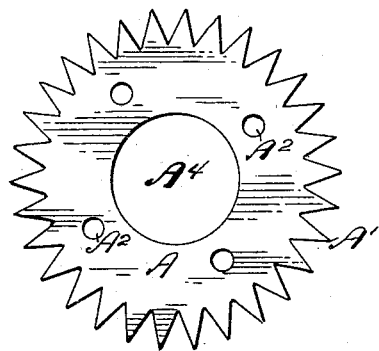
Inventor
Constant De Mattia
By J. E. Thomas
Attorney Patented May 19, 1931

1,805,514

UNITED STATES PATENT OFFICE

CONSTANT DE MATTIA, OF DETROIT, MICHIGAN, ASSIGNOR TO VINCENT STEEL PROCESS COMPANY, OF DETROIT, MICHIGAN, A CORPORATION OF MICHIGAN

EMERY WHEEL DRESSING TOOL

Application filed August 12, 1930. Serial No. 474,695.

My invention relates to a tool for dressing the surface of emery or other grinding wheels, shown in the accompanying drawings and more particularly described in the following specification and claim.

One of the objects of the present invention is to provide a unitary cutting or tooling element comprising a plurality of annular discs having sharp V-shaped peripheral teeth grouped in staggered relation and secured together to form a unitary device of suitable width and diameter.

A further object of the invention is the means employed for mounting the cutting or dressing-tool element upon an arbor extending through the annular discs fitted with sleeves in which are housed anti-friction bearings to permit the cutting element to rotate freely while the sleeves are held against turning,—the several parts combined forming a unit held in the yoke-shaped end of a supporting arm.

With the foregoing and other objects in view which will appear as the description proceeds, the invention further resides in the combination and arrangement of parts and in the details of construction hereinafter described and claimed, it being understood that changes may be made in the precise embodiment of the invention herein shown without departing from the spirit of the same.

In the drawings accompanying this specification:

Figure 1 is an elevation of the unit mounted in the yoke-shaped end of a supporting arm.

Figure 2 is a longitudinal cross-sectional view through the unit mounted in the supporting arm, taken on or about line 2—2 of Figure 3.

Figure 3 is an end elevation of the yoke-shaped supporting arm and cutting unit mounted therein.

Figure 4 is a side elevation of a unit comprising a group of cutting discs riveted together supported upon an arbor, between the annular sleeves in which the arbor is journaled.

Figure 5 is a side elevation of one of the discs with its V-shaped cutting teeth.

Referring now to the letters of reference placed upon the drawings:

A denotes a disc having a plurality of sharp V-shaped peripheral teeth $A^1$ and a series of holes $A^2$ for the passage of rivets or bolts $A^3$, whereby a plural number of discs may be secured together with their teeth in staggered relation—see Figures 3 and 4—to form a cutting tool of suitable width.

The annular discs A thus grouped and riveted together are supported upon and between opposing collars B, B, mounted on an arbor C, extending through a central opening $A^4$ in the discs. The collars B, B are provided with flanges $B^1$ overlapping and adapted to grip the faces of the outer discs of the cutting unit, with an annular neck $B^2$ surrounding the arbor C extending through a central opening in a pair of sleeves or trunnions D, D in which are housed ball-races forming anti-friction bearings E, E for each end of the arbor.

The arbor C has an enlarged polygonal head $C^1$ at one end, its opposite end being threaded to receive a nut $C^2$, which upon adjustment bears upon the inner annular element of the ball-race forcing the latter into impinging contact with the annular neck $B^2$ of the collars B, B thereby causing the flanges $B^1$, $B^1$ of the collars to bear upon and grip the outer discs A of the cutting unit.

The sleeves or trunnions D, D are rigidly held in the split hubs F, F of the yoke-shaped end $F^1$ of a supporting arm G, in turn mounted in suitable holding means, not shown.

H, H are screw-caps constructed with internally tapering screw-tapped rims adapted to engage the tapering screw-threaded flanges $F^2$ of the split hubs F at the yoke-shaped end of the supporting arm, which when adjusted serves to compress the hubs into gripping engagement with the sleeves D, D, to secure the latter against rotation.

$H^1$ are polygonal-shaped heads integral with the caps H, to receive a wrench for the manual adjustment of the caps upon the split hubs of the arbor bearing.

Having now indicated the several parts by reference letters, the construction and operation of the device will be readily understood.

The grinding wheel to be dressed or resurfaced is forced while revolving into impinging contact with the sharpened teeth of the cutting element, which being rotated though contact therewith cuts away the worn surface of the grinding wheel thus quickly restoring its original grinding surface.

Having thus described my invention, what I claim is:

A device of the character described, comprising a plurality of annular discs having V-shaped peripheral teeth, means for securing said discs together to form a unit with the teeth of the respective discs in staggered relation; a supporting arbor revolvable with the cutting disc, a pair of sleeves fitted with anti-friction bearings, in which the arbor is journaled, an arm having a yoke-shaped end with tapering screw-threaded split hubs to receive and grip the sleeves, and caps having tapering tapped screw-threaded flanges engaging said hubs, whereby upon adjustment of the caps the hubs may be compressed to grip and hold said sleeves against rotation.

In testimony whereof, I sign this specification.

CONSTANT DE MATTIA.